United States Patent Office 3,195,222
Patented July 20, 1965

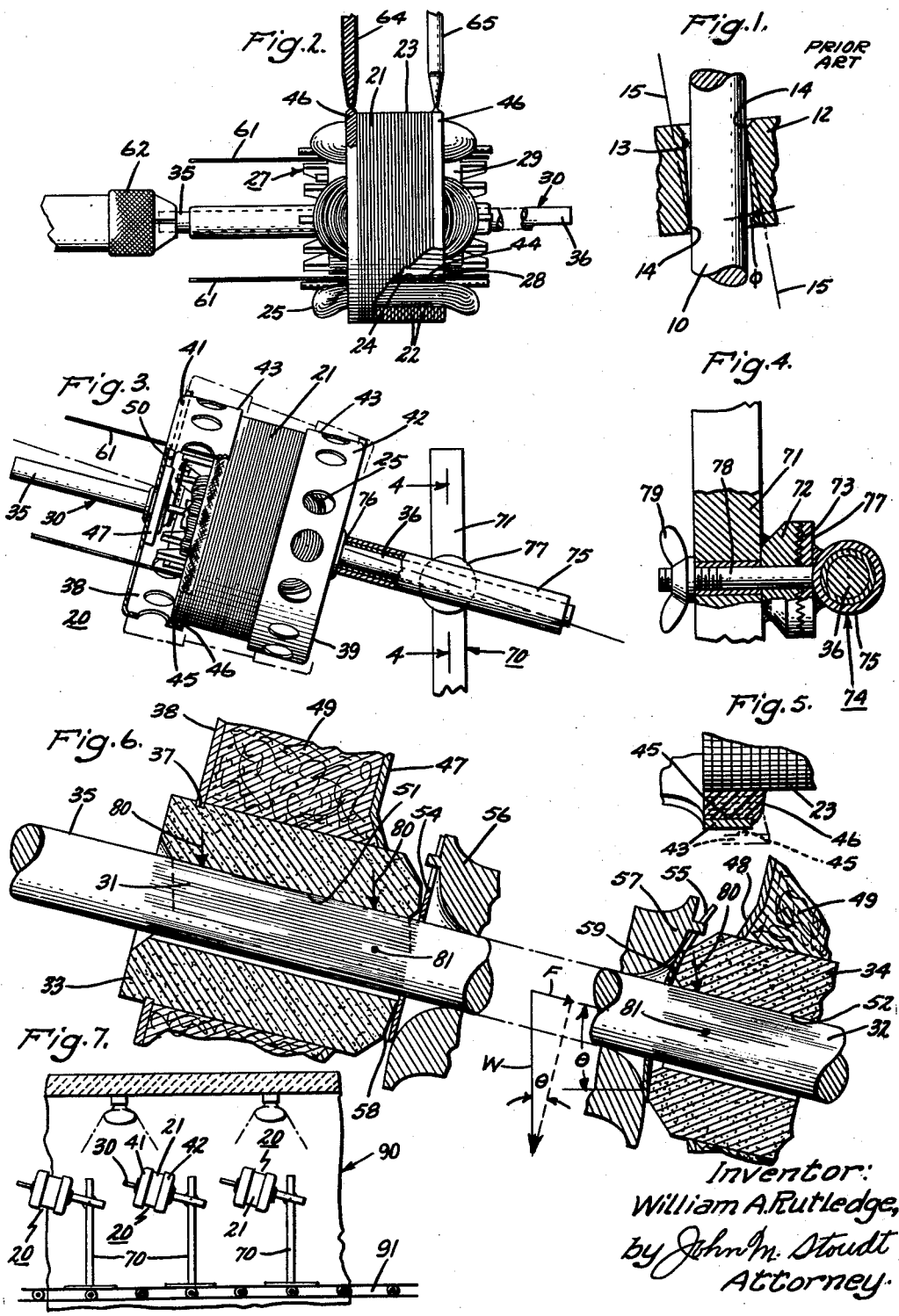

3,195,222
METHOD OF ASSEMBLING DYNAMOELECTRIC MACHINES
William A. Rutledge, Fort Wayne, Ind., assignor to General Electric Company, a corporation of New York
Filed July 5, 1962, Ser. No. 207,745
7 Claims. (Cl. 29—155.5)

This invention relates in general to the manufacture of dynamoelectric machines, and in particular, to an improved method of manufacturing and assembling small and fractional horsepower electric motors.

In the past considerable difficulty has been experienced during the mass production manufacture of dynamoelectric machines, especially motors of the smaller sizes, in achieving accurately aligned bearing and shaft components with any degree of consistency and economy of manufacture. As is well known by those skilled in the dynamoelectric machine art, an extremely important and critical factor directly affecting machine performance, i.e., motor efficiency and longevity of operation, is the degree of interference or journal friction existing between the shaft supporting bearings and the rotor shaft journal surfaces, which is built into the motor during its fabrication.

I have determined that even the slightest variation, either in a co-axial relation between the internal bearing surfaces which may journal the shaft on either side of a rotor or in a true parallel relation of these internal surfaces and the shaft journal surfaces which they support, will result in a cocking of the shaft and bearings relative to one another. This in turn rather drastically reduces the available journal area of contact between the cooperating surfaces for supporting the shaft and produces interference with freedom of shaft rotation. In addition, under these circumstances, the shaft has a tendency to pump lubricant only in one direction, from one end of the bearing toward the other, regardless of direction of shaft rotation, causing a flooding of the one end and an excessive loss of lubricant.

The intricacy of the foregoing problem may become more apparent and better appreciated from FIG. 1. In the exemplification identified by the legend, Prior Art, numeral 10 denotes a standard shaft having a highly finished journal surface 11 and character 12 indicates a porous sleeve bearing of the inherently weak sintered type formed with an accurately dimensioned internal journal surface 13. For the purpose of discussion, it will be assumed that shaft 10 and bearing 12 are of the commercially available ½ inch nominal diameter variety conventionally employed in many fractional horsepower motors. The bearing is nominally ½ inch in length, with a toleranced effective journal length of 0.375 inch. The running clearance of surfaces 11 and 13 is within the range 0.0006–0.0010 inch (0.6 to 1.0 mils).

From FIG. 1 and the dimensions set out above, it will be seen that a cocking of the shaft and bearing by a mere fraction of a degree, $\phi$, effects a line type of supporting engagement and extremely high unit pressure at points 14 which in turn produces rapid bearing and shaft wear. If the cocked position of the shaft relative to the bearing is beyond that shown in solid (e.g., beyond approximately 18 minutes of a degree for $\phi$), then the journal friction may become so great as to lock the shaft against rotation, commonly referred to as a "frozen shaft" condition. This latter condition may occur, for instance, where shaft 10 and bearing 1 1are subjected to heat during the attachment of a metallic end shield to a stator frame. This heat may result, for example, from a welding operation or the like. Due to the difference in their thermal expansion characteristics, the bearing bore and shaft become enlarged at different rates, the rate of change for the bearing being greater than that for the shaft. Consequently, unless extreme care is exercised as the end shield and frame are attached, the bearing and shaft may tend to assume the relative position suggested in FIG. 1 by broken lines 15. Upon cooling of the parts after such attachment and the bearing attempts to return to its normal unheated size, a unit pressure may well be built up at points 14 sufficiently great to lock the shaft against rotation, or if the pressure is of sufficient magnitude, a structurally weak bearing may crack at points 14, destroying its usefulness to support the shaft entirely.

Another vexing problem which confronts motor manufacturers is how to provide a very limited amount of axial freedom or end play of rotor movement in the motor, or in the case of pre-loaded thrust bearing systems where the system provides an initial rotor centering force tending to maintain it in a normal axial position, how to pre-load the system during manufacture within pre-selected limits by an economical procedure not requiring toleranced parts.

Accordingly, it is a general object of my invention to provide an improved method of fabricating dynamoelectric machines, and a more specific object is to do so by a procedure which is both economical to practice and adaptable for use in the mass production manufacture of motors.

Another object is the provision of an improved method especially suitable for use in the manufacture of small motors and the like which insures excellent co-axial alignment of internal bearing surfaces and a true parallel relation of these surfaces relative to the journal surfaces of the shaft with a high degree of consistency at a low unit cost.

Still another object of my invention is to provide an improved method of fabricating dynamoelectric machines, such as small motors or the like, which not only achieves improved alignment of component parts, but also is capable of inexpensively setting a predetermined amount of rotor shaft end play or pre-load in each machine with a minimum of variation from one machine to the next.

In carrying out the objects in one form thereof, I provide an improved procedure for making motors and the like in which I achieve co-axial alignment of the bearing journal surfaces and a parallel relation of these surfaces with the shaft by initially arranging the stator and end shield assemblies adjacent one another in loosely adjustable non-engaging spaced relation, with the rotor shaft extending into the bearing and an annular air gap established between the rotor and stator. An adhesive, substantially non-shrinking, material is disposed in its unhardened state in the space between and in contact with each end shield assembly and the stator. This material permits unimpeded relative movement of these members during subsequent steps of manufacture. Each end shield assembly is supported in a preselected non-vertical position primarily by a parallel engagement of the bearing journal surfaces and shaft. In particular, the rotor shaft is disposed at a preselected angle less than 90° relative to the horizontal, with the angle being such that the center of gravity of each end shield assembly is carried by the shaft in a vertical plane which projects through the shaft axis not substantially beyond the confines of the parallel engagement in an axial direction; that is to say the center of gravity lies in a vertical plane transversely perpendicular to the shaft axis not substantially beyond the axial limits of the parallel engagement to prevent creation of a moment of sufficient magnitude to cause the cocked bearing and shaft relation mentioned above thereby tending to insure such parallel engagement. While the parts are disposed in the non-vertical position, the adhesive material is hardened and the parallel relation is built into the machine for its operating life.

By a further aspect of the invention, in machines having a pre-loaded type thrust bearing system, the non-vertical position of the shaft is such that the weight of the machine components provide a pre-load force during assembly of a preselected magnitude related to the sine of the angle defined by the shaft with the horizontal. While this angle is being maintained and the component parts are being aligned, the end shield assemblies and stator are fixedly connected together without disturbance of the structural interrelation of parts already explained. In this way, the weight of the machine components automatically and accurately provide the correct pre-load for a given thrust system without requiring special and costly equipment or expensive manufacturing procedures.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawing which illustrates the preferred embodiment of the invention.

In the drawing:

FIG. 1 is a fragmentary view of a conventional shaft and sleeve bearing journal surface to illustrate the type of misalignment which frequently occurs as a consequence of dynamoelectric machine assembly procedures practiced prior to the present invention;

FIG. 2 is a side elevational view, partially broken away, showing one manner in which unhardened bonding material may be applied to the circumference of a stator;

FIG. 3 is a side elevational view of the rotor, stator, end shields and other motor components in properly assembled relation on a shaft retaining jig;

FIG. 4 is a view of the jig taken along line 4—4 in FIG. 3;

FIG. 5 is an enlarged fragmentary view of part of the motor of FIG. 3 illustrating the unhardened bonding material in the space between one of the bearing supporting end shields and the stator core which compensates for displacement of parts as the shaft and bearings achieve true alignment;

FIG. 6 is an enlarged partial view of the shaft, shaft supporting bearings, and thrust bearing assemblies to reveal the manner in which the present invention automatically establishes accurate bearing-shaft alignment and the proper amount of thrust bearing pre-load in the motor; and FIG. 7 is a view partly in cross-section of motors assembled by the present invention being transported through an oven to harden the bonding material for effecting permanent securement of the parts in the proper relationship to each other.

Turning now to FIGS. 2–7 inclusive in more detail, for purposes of explanation and disclosure, the preferred form of the invention has been illustrated in connection with the fabrication of a small horsepower electric motor 20 of the alternating current single phase induction, double shaft output shaft variety, incorporating a pre-loaded type thrust bearing system. More specifically, the motor includes a conventional stator 21 which is formed with a stack of secured together magnetizable laminations 22 having a generally circular external surface 23 and a cylindrical rotor receiving bore 24. The laminated stack carries a number of energizing windings or coils 25 in the usual way.

A rotor 27, formed with a stack of magnetic laminations having a circumferential surface 28 turned down to an accurate dimension and a standard squirrel cage winding 29, is fixedly attached to rotate as a unit with a shaft 30 provided with highly finished surfaces 31 and 32 respectively journaled in bearings 33 and 34 disposed on opposite sides of the rotor, with the output ends 35, 36 of the shaft projecting beyond the confines of the bearings. In the illustrated arrangement, these bearings are mounted, as by a staked connection indicated at 37, to generally cupped shaped members 38 and 39 of end frames or end shield assemblies 41 and 42, having flanges 43 in facing relation and cooperate to support rotor surface 28 within stator bore 24 such that an annular air gap 44 is defined therebetween.

For reasons which will become apparent from the ensuing explanation of my invention process, each end shield assembly is preferably attached in a rigid fashion to stator 21 by an arrangement in which the inner walls 45 of flanges 43 are in overlapping spaced relation with the ends of stator surfaces 23 and united therewith by hardened adhesive material 46; e.g., thermosetting epoxy resin. The significance of the spaced relation and characteristics of material 46 which are important to obtain optimum benefit from the practice of my process will be explained in detail hereinafter.

Besides supporting bearings 33 and 34 for mounting shaft 30, end shield members 38 and 39 also carry cups 47 and 48 which encircle the bearings as shown in FIGS. 3 and 6. These cups form lubricant reservoir spaces for accommodating absorbent felt pads 49 which are impregnated with oil or other suitable bearing lubricating means. For the admission of lubricant to each reservoir, a tube 50 is provided to communicate from externally of end shield assemblies 41, 42 into the reservoir spaces. In order to convey lubricant from pads 49 to the accurately finished and smooth inner bearing journal surfaces 51, 52 (FIG. 6) during motor operation for lubrication purposes, the illustrated bearings are of the sintered type and permit the lubricant to seep through the bearing walls at a predetermined rate of flow.

It will be recalled from above that the motor of the exemplification includes a pre-loaded type thrust bearing system. For purposes of disclosure of my invention, the system shown is constructed in accordance with that revealed in U.S. Patent No. 3,038,765 granted to M. D. Tupper and assigned to the same assignee of the present invention. This system, most clearly shown in FIG. 6, is linear throughout its normal range of operation and includes a pair of springs 54, 55, preferably of annular star configuration, maintained under compression between thrust collars 56, 57, which are fixed to rotate with shaft 30. Tapered inboard ends 58, 59 of bearings 33, 34 serve as the thrust receiving surfaces for the axial forces passed to the thrust collars from the rotor. The springs absorb and cushion the axial forces over the normal operating range and provide a biasing force tending to center the rotor and shaft in a normal axial position within stator bore 24.

The preferred manner in which I fabricate motor 20 is shown by FIGS. 2–7 inclusive. Initially I prefer to establish a temporary fixed relation between stator 21 and shaft journal surfaces 31, 32 as well as an annular air gap 44 between the stator and rotor. These relationships, which are maintained during subsequent steps of manufacture, may be provided by any suitable means, such as with a number of metal gage strips 61 of the correct thickness disposed in air gap 44. The strips serve to orient the rotor concentrically and firmly within the stator and to hold the shaft, rotor, and stator in a fixed relation as a sub-assembly until the component parts of the motor have been secured together. When assembling motors having pre-loaded thrust bearing systems, I prefer to place rotor 27 slightly off axial center (to the right in FIG. 2) in stator bore 24. The reason for this preference will be explained below. It is convenient at this time in the assembly procedure to apply material 46 onto the proper peripheral location on stator 21, e.g., at each end of stator surface 23 in the exemplification. This may be readily accomplished by placing output end 35 of shaft 30 in a common adjustable chuck 62, and while rotating the motor sub-assembly as a unit by means of the chuck, transferring material 46 in its unhardened state through nozzles 64 and 65 onto stator surface 23 in the form of circumferentially extending beads of the desired thickness.

After material 46 has been applied in its unhardened state and the motor sub-assembly has been removed from chuck 62, thrust springs 54, 55 and end shields assemblies 41, 42 may be assembled onto shaft 30 on either side of rotor 27, and projecting shaft end 36 inserted in a supporting fixture 70 shown in FIGS. 3 and 4. It should be noted that when end shield assemblies 41, 42 of motor 20 are disposed adjacent stator 21 as shown in FIG. 3, gages 61 extend through suitable ventilation openings 67 formed in member 38 in axial alignment with air gap 44 to permit their subsequent removal. Solely for purposes of illustration, fixture 70 includes an upright support 71 on which is mounted or welded a stationary part 72 having radial serrations 73. An angularly adjustable shaft holder 74 is carried by support 71 and has a tubular casing and bearing assembly 75 for receiving shaft end 36, with extremity 76 of the assembly provided perpendicular to the axis thereof. Holder 74 also includes radial serrations for mating engagement with serrations 73 of support 71 and provide the means, together with bolt 78 and nut 79, for locking assembly 75 in a pre-selected angular position on support 71.

In studying the problem of bearing-shaft alignment, I discovered that it is important, if not essential, to establish and maintain certain structural machine relationships during the fabrication procedure in order to build into a dynamoelectric machine for its operating life, such as motor 20, the critical co-axial relation between the bearing internal journal surfaces and the true parallel relation of these surfaces with respect to the shaft journal surfaces which they rotatably support. More specifically, referring to FIGS. 5 and 6, by an important aspect of the present invention I attain the foregoing shaft-bearing relations by supporting end shield assemblies 41, 42 of the illustrated embodiment in their finally assembled position on shaft 30, which is disposed non-vertically, and utilizing the weight of each end shield assembly to maintain the parallel engaging relation of shaft surfaces 31, 32 with bearing journal surfaces 51, 52 for their axial lengths until end shield members 38, 39 have been fixedly secured to stator 21. This is carried out, as will be seen from FIG. 6, by having the weight (indicated by arrows 80) of the end shield assemblies primarily supported through the engagement of shaft 30 and the bearing journal surfaces, with the center of gravity 81 of the assemblies passing through the confines of that engagement. In other words, taking end shield assembly 38, were center of gravity 81 or weight vector at that location permitted to lie in a plane transversely perpendicular to the shaft axis axially beyond the supporting area of contact between journal surfaces 51 and 31 of the shaft and bearing respectively, a moment would be created around bearing end 59. Depending upon the mass of the end shield assembly and the length of its moment arm from bearing end 58, the moment could be of sufficient magnitude to cause a tilting action of assembly 41 around bearing end 58 at the shaft. This, in turn, would cock the bearing relative to the shaft in the same fashion as that illustrated in FIG. 1 to produce the totally undesirable and ineffectual line type engagement between the shaft and bearing, points 14 in FIG. 1.

It will be appreciated, of course, that for light weight end shield assemblies, the center of gravity may be disposed slightly beyond the axial limits of the shaft-bearing journal engagement without creating a moment large enough to effect the undesirable tilting or cocking action referred to above. Where, on the other hand, the center of gravity of an end shield assembly would normally lie axially beyond one of the bearing ends by any appreciable distance, such as might arise if flange 43 of end shield member 38 were formed with a relatively large axial dimension, then compensating weights (not shown) may be conveniently attached on a temporary basis at the opposite end of the assembly to bring the center of gravity back into the desired aforedescribed location.

In order to insure the desired alignment of parts previously discussed, the spaced relation of the end shield flange 43 and the unhardened material 46 (FIG. 5) should be such that they do not impede a generally free angular movement of the end shield assemblies relative to stator 21 as the bearings are being properly located on the shaft. Thus, for material 46, I prefer to employ an adhesive material which in its unhardened state is sufficiently elastic and fluid to permit the requisite motion of the end shield assemblies without breaking the adhesive bond between the material and adjacent surfaces 23 and 45 of the respective stator and end shield assemblies. FIG. 5 shows the type of compensating relative movement between surfaces 23 and 45, with flange 43 and material 46 moving from the solid to the broken line position as the bearing and shaft assume their proper supporting and contacting relation. In addition, during subsequent securement of the parts, when the material is being hardened, it should not shrink substantially in size from its unhardened to the hardened state. Otherwise stresses may be introduced which would adversely affect the alignment of parts achieved during prior steps of assembly. A thermosetting organic epoxy resin tending to be thixotropic in nature is one of several materials which has the desired properties, and has been successfully used even where the aforementioned angular movement was in excess of 40 mils. It should be recognized by now that without departing from my invention, unhardened material 46 may be applied to either or both of the adjacent surfaces of the stator and end shield assemblies before assembly of the motor parts or after the components have been disposed in loosely assembled relation, such as illustrated in FIG. 3. Further, although stator 21 of the illustrated embodiment is not mounted within a central shell or frame, the term "stator" as used herein is intended to apply to this construction as well as other obvious structural modifications since the exact construction of the stator and end shield assemblies is not particularly critical to my process of manufacture.

If alignment of bearings and shaft were the only consideration in the fabrication of motor 20, the aforedescribed positioning of the parts could be accomplished with shaft 30 disposed horizontally in which case it would be necessary to turn or slide each end shield slightly once it has been arranged on the shaft adjacent the rotor to make sure that there is no interference with the requisite axial length of journal contact between the bearings and supporting shaft. However, with motor 20 of the exemplification incorporating a preloaded thrust bearing system, in accordance with a further aspect of my invention, by relating the angular position of the shaft or of shaft journal surfaces 51, 52 from the horizontal (angle $\theta$ in FIG. 6) to the amount of pre-load, I am not only able to use the weight of the motor components for insuring the critical area of journal contact while allowing some latitude and simplicity in handling of the motor components during assembly, but in addition I employ the weight of the components to advantage for automatically achieving the correct amount of pre-load in the thrust system.

By way of explanation, I have chosen motor components having the following masses:

|   | Pounds |
|---|---|
| Each end shield assembly | ¼ |
| Rotor and shaft assembly | 1 |
| Stator | 2 |

It is also assumed that the minimum system pre-load force requirements as determined in part by the spring constant factor $K/W$, for the Tupper thrust system in this size motor dictate a minimum angle $\theta$ of 15°. With the motor parts assembled as shown in FIG. 3, axial displacement of the parts will be prevented by the abutting engagement of the outboard end of bearing 34 with end 76 of the fixture. Consequently, the pre-load force on thrust spring 54, characterized by letter F in the force vector diagram included in FIG. 6, is equal to the weight, W, of end shield assembly 41 multiplied by the sine of 15°. Stated in equation form, $F = W \sin \theta$, or the pre-load force on spring 54 is 0.065 pound. With respect to spring 55, end shield assembly 41, the rotor and shaft assembly, and stator 21 (a total weight "W" of 3¼ pounds) would result in a pre-load force F of approximately 0.84 pound on that spring. Since the greater pre-load is on spring 55, when initially assembling stator 21 and rotor 27 together, I prefer to place rotor 27 slightly off axial center within stator bore 24 in the direction of the greater pre-loaded spring 55. Thus, after gage strips 61 are finally removed from air gap 44, the springs 54 and 55 will tend to center the rotor in the bore.

It is recognized that the journal friction between shaft end 36 and bearing assembly 75 will have some adverse effect on the ultimate size of force component F on thrust spring 55, but this friction and resulting effect is not appreciable. The best angle $\theta$ for a given motor size and thrust pre-load system can readily be determined by experimentation, calculation or otherwise. However, when producing motors having pre-loaded systems, I prefer to keep angle $\theta$ above 14° since this is the angle necessary to overcome the coefficient of friction, 0.25, for most non-hydrodynamic bearing-shaft surfaces. Thus, above 14° journal surfaces 51, 52 will tend to slide freely on shaft 30 during assembly without necessitating the time consuming turning operation of the end shields by the operator to insure the proper engaging relation between the shaft and bearings. As a practical matter, in the manufacture of small horsepower motors having pre-loaded spring systems with which I am acquainted, angle $\theta$ may vary between 14 and 45 degrees.

With the parts in their final assembled relation (FIGS. 3, 5, and 6) and while the shaft is held by fixture 70 at an angle $\theta$ from the horizontal for motor 20 of the illustrated embodiment, material 46 is hardened or cured to the point wherein it will retain the rotor supporting means in a fixed relationship to the stator 21. Any suitable means may be employed, such as by the application of a controlled heat provided by oven 90 in FIG. 7. To effect the hardening step, motor 20 and fixture 70 may be placed onto a belt-type conveyor 91 which transports them through the oven at a regulated rate. Of course, any curing means may be utilized; for instance, an adequate amount of hardener may be included in material 46 so that it could "set up" at room temperature in a predetermined length of time. After the hardening step has been accomplished, the gages may be removed from the air gap through the ventilation openings to free the rotor and shaft for relative rotation with regard to stator 21.

It will be readily manifest from the foregoing that the method of the present invention provides an accurate co-axial alignment of the bearing journal surfaces, a true parallel relation of these surfaces with journal surfaces of the shaft, and a closely controlled air gap between the rotor and stator. In addition, my process tends to minimize stresses, which would normally adversely affect the alignment of parts. Furthermore, when fabricating pre-loaded thrust systems by my invention, the weight of the motor components themselves builds the requisite pre-load into the system automatically without necessitating the use of expensive or time consuming equipment. A mass production manufacture is permitted by the present invention which produces machines having a minimum variance in quality between machines, at a relatively low unit cost.

It should be apparent to those skilled in the art, while I have shown and described what at present is considered to be the preferred embodiment of my invention in accordance with the patent statutes, changes may be made in the disclosed method without actually departing from the true spirit and scope of this invention, and I therefore intend to cover in the following claims all such equivalent variations as fall within the invention.

What I claim as new and desire to secure by Letters Patent of the United States is:

1. A method of fabricating a dynamoelectric machine having a stator, a rotatable assembly having a rotor and a shaft carrying said rotor, rotor supporting means including at least one bearing formed with a journal surface, and a pre-loaded thrust bearing system, comprising the steps of: arranging the stator and the rotor supporting means adjacent and in loosely adjustable spaced relation to one another, with positioning means holding the rotatable assembly and stator stationary relative to each other, with the shaft extending into said bearing, and with an adhesive substantially non-shrinking material in an un-hardened state disposed in the space between and in contact with said stator and rotor supporting means; supporting the rotatable assembly in a preselected non-vertical position related to the weight of predetermined machine components including at least the one bearing and to the desired preload of the thrust bearing system, with the weight of said predetermined machine components being supported primarily by a parallel engaging relation between the bearing journal surface and shaft and providing the force for pre-loading the thrust system; said un-hardened material permitting unimpeded relative axial movement of the rotor supporting means with respect to the rotor shaft and stator as the parallel engaging relation is being established between the shaft and the bearing journal surface; hardening said material while maintaining said shaft and bearing in said parallel engaging relation such that upon hardening of said material said parallel engaging relation is preserved and a predetermined pre-load is provided in said thrust system, and releasing the stator and rotatable assembly for relative rotation by removing the positioning means therefrom.

2. A method of assembling a dynamoelectric machine having a stator, rotor, a shaft carrying said rotor, a pair of end shield assemblies each mounting a bearing formed with a journal surface for supporting the shaft on either side of the rotor, and a pre-loaded thrust bearing system for biasing the rotor comprising the steps of: arranging each end shield assembly adjacent and in loosely adjustable non-engaging spaced relation at a side of the stator, with the rotor shaft inserted in the bearings, with a predetermined air gap established between said rotor and stator by spacing means, and with an adhesive substantially non-shrinking thermosetting material in an unhardened state disposed in the space between and in engagement with each end shield assembly and said stator; supporting each end shield assembly primarily by a parallel engagement between the bearing journal surfaces and the shaft with the shaft being disposed in a preselected non-vertical position related to the weight of predetermined machine components including at least one end shield assembly and the pre-load of the thrust system, with the center of gravity of each end shield assembly being located in a vertical plane projecting through the shaft not substantially axially beyond said parallel engagement between the associated bearing and shaft, and with the unhardened material allowing unimpeded relative angular movement of each end shield assembly with respect to the rotor shaft and stator as the parallel relation is being achieved; hardening said thermosetting material while preserving said air gap and maintaining said parallel engagement of said bearings and shaft so that upon hardening of said material, the parts will be secured in a permanently fixed relation for the operating life of the machine, and releasing the rotor and stator for relative rotation by removing the spacing means therefrom.

3. A method of fabricating a dynamoelectric machine having a stationary assembly, a rotatable assembly including a rotor and a shaft carrying said rotor, rotor supporting means including at least one bearing formed with a journal surface, and a preloaded thrust system, comprising the steps of: arranging the stationary assembly and the rotor supporting means adjacent one another, with the shaft held in a fixed position relative to said stationary assembly by positioning means engaging the respective assemblies and with the shaft extending into said bearing, supporting the rotor supporting means primarily by the engagement of said shaft and bearing journal surface at angle $\theta$ of less than 90° with respect to the horizontal where the weight of predetermined machine components including at least the one bearing provide a pre-load force of pre-selected magnitude related to the sine of angle $\theta$, fixedly attaching said stationary assembly and rotor supporting means together while supported at said angle, and releasing the stationary and rotatable assembly for relative rotation by removing the positioning means therefrom.

4. A method of fabricating a dynamoelectric machine having a stationary assembly, a rotatable assembly including a shaft, and means for supporting the assemblies for relative rotation including at least one bearing journal surface, the method comprising the steps of: arranging the stationary assembly and supporting means adjacent one another, with the stationary and rotatable assemblies held in a fixed position by positioning means engaging both assemblies, and with the shaft of the rotatable assembly being in engagement with the bearing journal surface; supporting the supporting means on the shaft primarily by a parallel engagement between the shaft and bearing journal surface, with the shaft being disposed at a preselected angle less than 90° relative to the horizontal, and with the angle being such that the center of gravity of the support means is located in a vertical plane projecting through the shaft not substantially beyond the parallel engagement in an axial direction thereby tending to maintain said parallel engagement; fixedly attaching the supporting means and stationary assembly together as the shaft supports the supporting means at the preselected angle whereby potential shaft and bearing journal misalignment resulting from the weight of the supporting means is minimized; and removing the positioning means from engaging relation with the stationary and rotatable assemblies to release the assemblies for relative rotation.

5. The method of claim 3 in which during the support of the rotor supporting means accomplished primarily by the engagement of the shaft and bearing journal surface at angle $\theta$, the center of gravity is also positioned relative to the shaft such that it is located substantially within the axial extent of said engagement whereby potential misalignment as a result of the weight vector for the rotor supporting means is minimized.

6. A method of fabricating a dynamoelectric machine having a stationary assembly, a rotatable assembly including a shaft, and at least one end frame having a bearing journal surface for supporting the assemblies for relative rotation, the method comprising the steps of: disposing the stationary assembly and at least one end frame next to one another, with the shaft held in a fixed position relative to the stationary assembly by positioning means engaging the stationary and rotatable assemblies, with unhardened adhesive material contacting adjacent regions of the end frame and stationary assembly, and with the shaft engaging the bearing journal of the end frame; supporting the supporting means on the shaft primarily by a parallel engagement between the shaft and bearing journal surface, with the shaft being disposed at a preselected angle substantially less than 90° relative to the horizontal, with the adhesive material allowing generally unimpeded relative axial movement between the shaft and end frame as said parallel engagement is being established, and with the angle being such that the center of gravity of the end frame is located not substantially beyond said parallel engagement in an axial direction thereby tending to insure said parallel engagement; hardening the adhesive material without disturbing said parallel engagement to secure the end frame and stationary assembly together as the shaft supports the end frame at the preselected angle whereby potential shaft and bearing journal misalignment resulting from the weight of the end frame is minimized; and removing the positioning means from engaging relation with the stationary and rotatable assemblies to release the assemblies for relative rotation.

7. A method of fabricating a dynamoelectric machine having a stationary assembly, a rotatable assembly including a shaft, and a pair of end frames each having one bearing journal surface for supporting the assemblies for relative rotation, the method comprising the steps of: positioning the stationary assembly and end frames adjacent one another, with the stationary and rotatable assemblies held stationary relative to one another by positioning means engaging both assemblies with an end frame disposed on each side of the stationary assembly, with unhardened adhesive material contacting the stationary assembly and each end frame, and with the shaft engaging the bearing journal surfaces; supporting the end frames on the shaft primarily by a parallel engagement between the shaft and each bearing journal surface, with the shaft disposed at a preselected angle substantially less than 90° relative to the horizontal, said unhardened adhesive material allowing relative axial movement between each end frame and the stationary assembly as said parallel engagement is being established, and said angle being such that the center of gravity of each end frame is located in a vertical plane projecting through the shaft not substantially beyond the associated parallel engagement in an axial direction, with the weight of the respective end frames acting to maintain said associated parallel engagement; hardening the adhesive material to secure the two end frames to the stationary assembly as the shaft supports each end frame at the preselected angle whereby potential shaft and associated bearing journal misalignment resulting from the weight vector of each end frame is minimized; and removing the positioning means from engaging relation with the stationary and rotatable assemblies to release the assemblies for relative rotation.

References Cited by the Examiner
UNITED STATES PATENTS 2,423,750   7/47   Benson   29—155.5
3,043,147   7/62   Will   29—155.5

WHITMORE A. WILTZ, *Primary Examiner.*
JOHN F. CAMPBELL, *Examiner.*